United States Patent [19]

Maruyama

[11] Patent Number: 5,031,040
[45] Date of Patent: Jul. 9, 1991

[54] SYSTEM CONVERTER DEVICE FOR CONVERTING A VIDEO SIGNAL HAVING A CERTAIN NUMBER OF SCAN LINES TO A VIDEO SIGNAL HAVING A LESSER NUMBER OF SCAN LINES

[75] Inventor: Masaki Maruyama, Matsudo, Japan

[73] Assignee: Sharp Kabushiki Kaisha, Osaka, Japan

[21] Appl. No.: 518,525

[22] Filed: May 3, 1990

[30] Foreign Application Priority Data

May 13, 1989 [JP] Japan .................................. 1-120129

[51] Int. Cl.5 ............................................... H04N 7/01
[52] U.S. Cl. ........................................ 358/140; 358/11
[58] Field of Search .................... 358/11, 12, 140, 138

[56] References Cited

U.S. PATENT DOCUMENTS 4,751,573  6/1988  Kubota ................................. 358/140
4,794,456 12/1988  Tsinberg ........................ 358/140 X
4,953,025  8/1990  Saitoh et al. ........................ 358/140

FOREIGN PATENT DOCUMENTS 61-26383 2/1986 Japan .

Primary Examiner—Victor R. Kostak

[57] ABSTRACT

A system converter device converts a video signal based on the MUSE system to a video signal based on the NTSC system. In the system converter device, two lines of scanning line signal based on the NTSC system are generated from three adjacent same numbered-type field lines of scanning line data included in the MUSE signal. The generated time-discontinuous scanning line signal is made continuous by an expanding circuit. The video information included in the MUSE signal is not lost by conversion, became a video signal based on the NTSC system is generated from all the scanning line signals forming 1 frame included in the MUSE signal. Therefore, it is possible to display the complete transmitted video on the display screen.

7 Claims, 8 Drawing Sheets

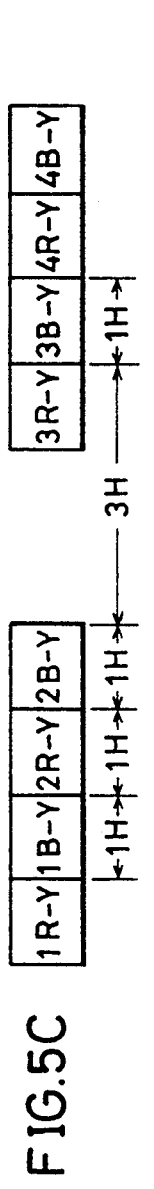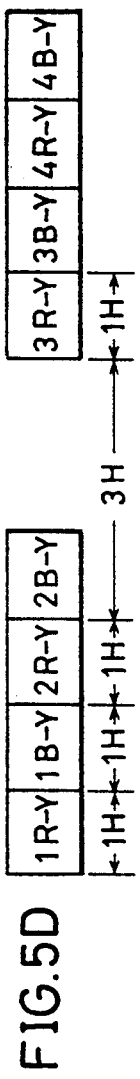

SYSTEM CONVERTER DEVICE FOR CONVERTING A VIDEO SIGNAL HAVING A CERTAIN NUMBER OF SCAN LINES TO A VIDEO SIGNAL HAVING A LESSER NUMBER OF SCAN LINES

BACKGROUND OF THE PRESENT INVENTION

1. Field of the Present Invention

The present invention generally relates to system converter devices for video signals, and more particularly, to a system converter device for converting video signals having a certain number of scanning lines to video signals having a less number of scanning lines. The present invention has particular application to a system converter device for converting video signals based on the MUSE system to video signals based on the NTSC system.

2. Description of the Background Art

In the high definition television system, the number of scanning lines is 1125 lines per frame, the interlace ratio is 2:1, and the aspect ratio is 16:9. On the other hand, the NTSC system uses 525 scanning lines per frame, an interlace ratio of 2:1, and an aspect ratio of 4:3. Since one channel of satellite broadcasting has a bandwidth of 27 MHz, video signals based on a high definition television system are bandwidth compressed to the bandwidth of 8.1 MHZ. The bandwidth compressed signals are transmitted through one channel of the satellite broadcasting. This transmission system is called "Multiple Sub-Nyquist Sampling Encoding" (hereinafter referred to as MUSE).

This MUSE transmission system is defined as a multiplexed subsample transmission system using offset sub-sampling between two fields and frames. Line sequential time axis integration (TCI) is employed in the MUSE transmission system, where the red color difference signal R-Y and the blue color difference signal B-Y have the time axis compressed to ¼. The compressed signals are time axis multiplexed at the horizontal blanking period of the luminance signal Y. Furthermore, the red color difference signal R-Y and the blue color difference signal B-Y are multiplexed line sequentially on odd number lines and even number lines, respectively.

When video signals of the high definition television system transmitted according to the MUSE transmission system, for example, are converted to video signals of the NTCS system, a conversion system is proposed in which the image portion of 1050 scanning lines and with the aspect ratio of 4:3 is extracted from the 1125 lines of scanning line signals according to a high definition television system having the aspect ratio of 16:9, and further removing one half of the 1050 lines, i.e., 525 lines.

However, when video signals are converted in such a manner, there was a problem that the image information on both sides of the display screen of the high definition television, that is to say, the right and left sides of the image that should be displayed on the display screen, for example, is lost.

More specifically, the video signal according to the high definition television system comprises a video region A and video regions B adjacent to both sides of region A on a display screen 71, as shown in FIG. 10A. In the conventional converting system mentioned above, only video region A of FIG. 10A is displayed as video region A' on a display screen 72, as shown in FIG. 10B. In other words, video regions B on display screen 71 are lost in display screen 72.

SUMMARY OF THE PRESENT INVENTION

An object of the present invention is to have all the video information that is present in the video signal of the high definition television system contained in the converted video signal in a system converter device.

Another object of the present invention is to generate a converted video signal on the basis of all video signals based on the high definition television system in a system converter device.

A further object of the present invention is to have all video information that is comprised in the video signal based on the MUSE transmission system contained within the converted video signal based on the NTSC system.

In summary, the system converter device in accordance with the present invention converts a first video signal having a first predetermined number of scanning lines per frame to a second video signal having a second predetermined number of scanning lines per frame. The first number is larger than the second number. The system converter device comprises a circuit for generating scanning line signals forming the second video signal in response to each group of scanning line signals of an adjacent third number of scanning lines in each frame of the first video signal, and a render-continuous circuit for making the generated time-discontinuous scanning line signal be time-continuous.

In operation, a scanning line signal forming the second video signal is generated in response to each group of the scanning line signals of an adjacent third number of scanning lines for each frame of the first video signal. That is to say, all the video information that is comprised in the first video signal will be contained in the second video signal because the scanning line signal forming the second video signal is generated in response to each group of the scanning line signals of an adjacent third number of scanning lines in the first video signal.

In another aspect, the present invention converts a first video signal having a first predetermined number of scanning lines per frame to a second video signal having a second predetermined number of scanning lines per frame. The first number is larger than the second number. The method of the present invention includes the steps of receiving a first video signal, generating a scanning line signal forming the second video signal in response to each group of scanning line signals of an adjacent third number of scanning lines for each frame of the first video signal, and making the generated into a time-discontinuous signal scanning line signal time-continuous.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5A–5F are schematic diagrams showing the relationship between the scanning lines of the system converter device shown in FIG. 1 and the coefficient to be multiplied;

DESCRIPTION OF THE PREFERRED EMBODIMENTS

Figure 1:
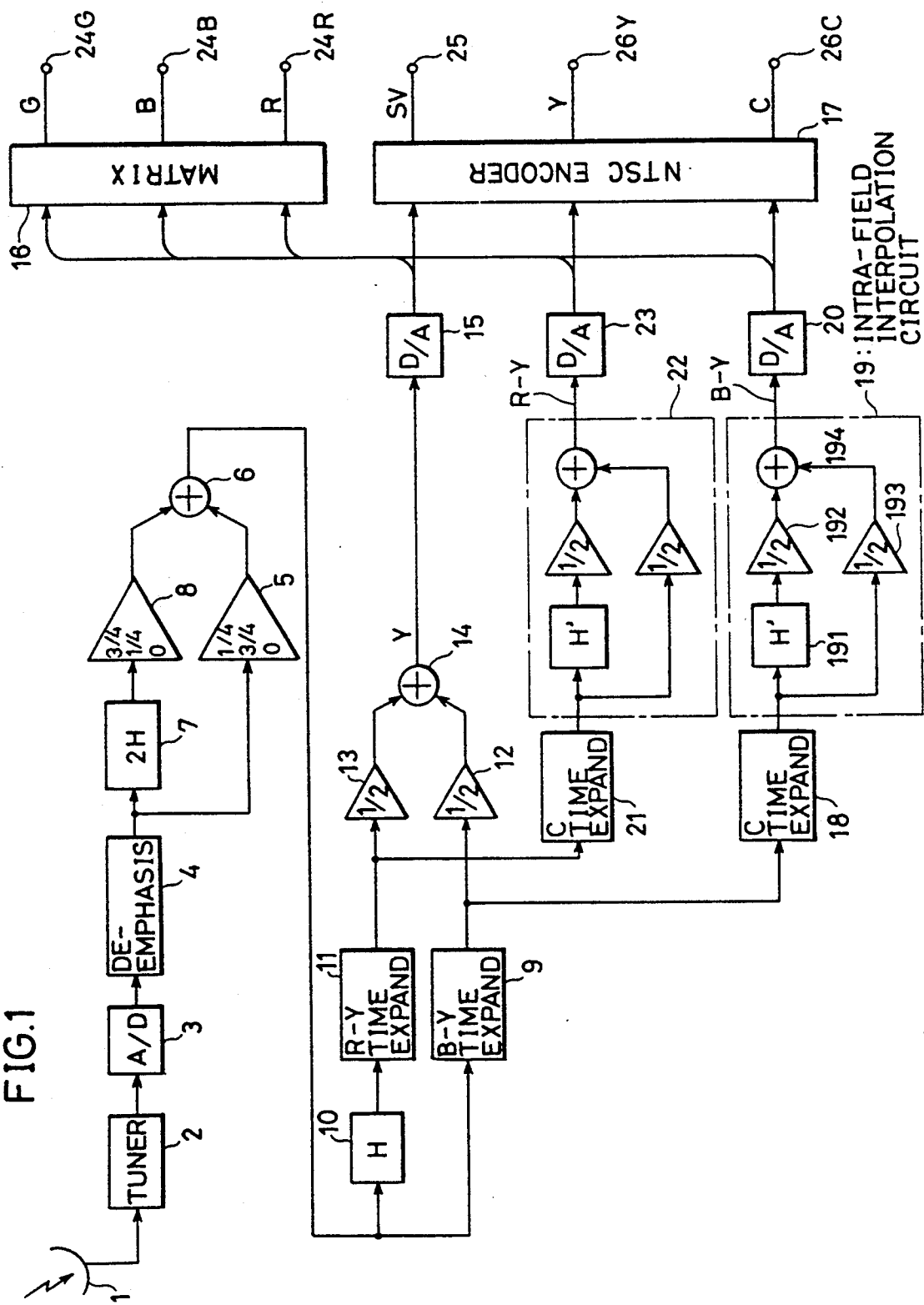
FIG. 1 is a block diagram of a system converter device in accordance with the present invention.

As an example of a signal according to the high definition television system, a MUSE signal transmitted via satellite broadcasting will be used below. Referring to FIG. 1, a satellite broadcasting signal received by an antenna 1 is applied to a tuner 2. The MUSE signal provided from tuner 2 is converted to a digital signal by an A/D converter 3. This digital signal is applied to a de-emphasis circuit 4, where de-emphasis processing is performed. The output signal of the de-emphasis circuit 4 is provided to an adder 6 via an coefficient multiplier 5 and is also provided to adder 6 via a coefficient multiplier 8 after being delayed for 2 horizontal periods (2H) by a delay element 7. 1H is equivalent to one horizontal period of the high definition television system, i.e., 1H=29.6 μsec. The number of scanning lines is converted from 1125 lines to 750 lines which is ⅔ of the MUSE signal by coefficient multipliers 5 and 8, adder 6, and delay element 7. The coefficient multiplier 5 is shown in detail in FIG. 2.

Figure 2:
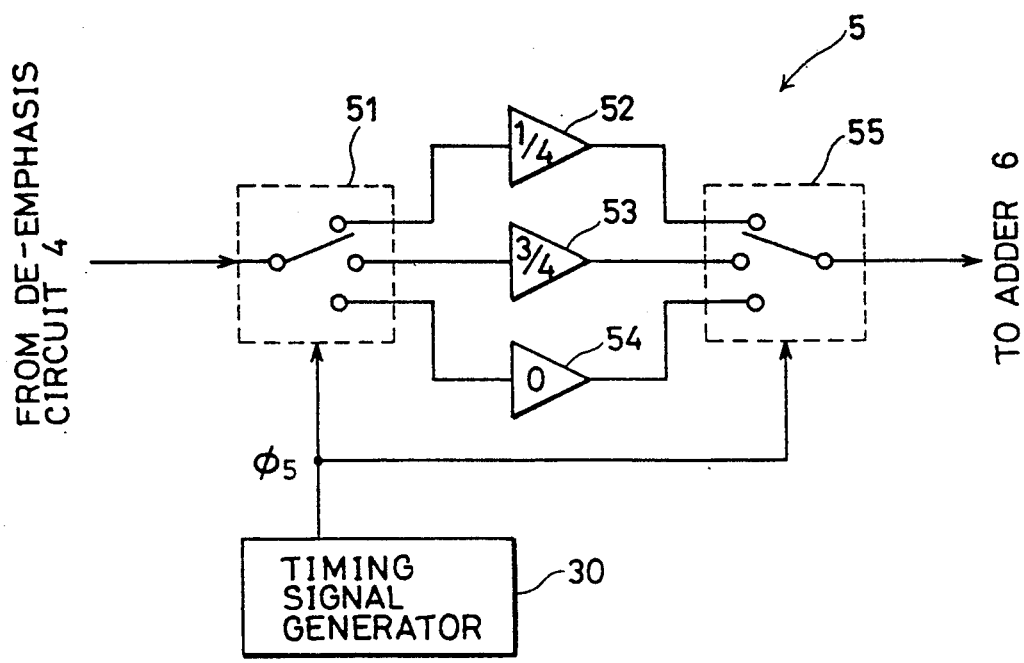
FIG. 2 is a block diagram of a coefficient multiplier 5 of FIG. 1.

Referring to FIG. 2, coefficient multiplier 5 comprises a switching element 51 connected so as to receive the output signal from the de-emphasis circuit 4, multipliers 52, 53 and 54 for multiplying predetermined coefficients, and a switching element 55 connected to the output of the multipliers. A timing signal generator 30 generates a clock signal $\phi 5$ in synchronism with the horizontal scanning line of the MUSE signal. Switching elements 51 and 55 operate in response to this clock signal $\phi 5$. The coefficients of ¼, ¾, and 0 are previously set to multipliers 52, 53 and 54, respectively.

Figure 3:
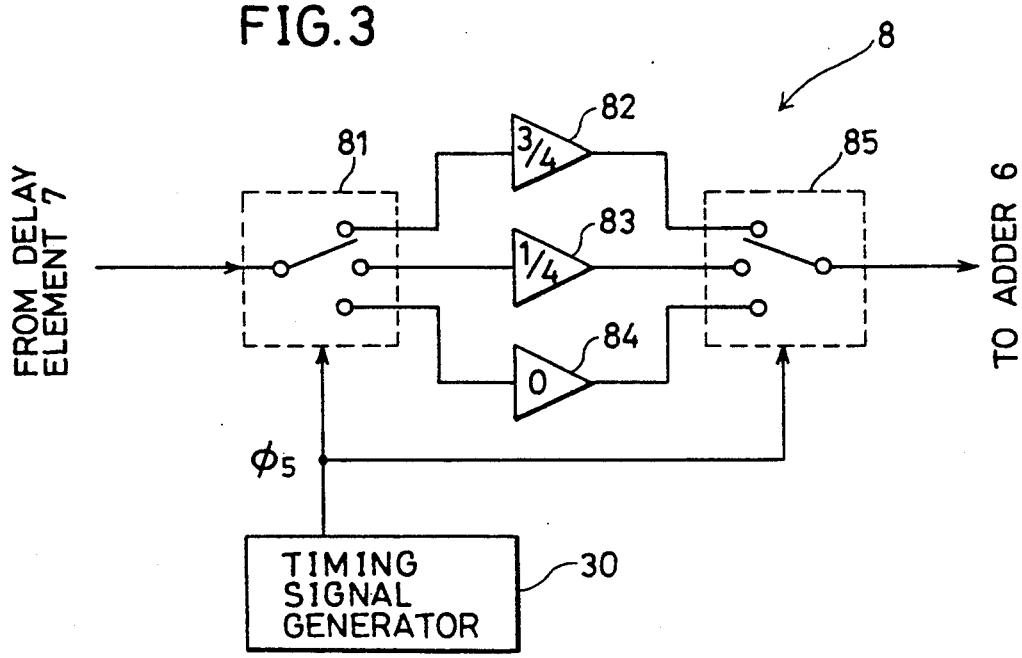
FIG. 3 is a block diagram of a coefficient multiplier 8 of FIG. 1.

FIG. 3 shows an example of coefficient multiplier 8 shown in FIG. 1. The coefficient multiplier 8 has a circuit configuration similar to that of coefficient multiplier 5 of FIG. 2, except that coefficients ¾, ¼, and 0 are previously set to multipliers 82, 83, and 84, respectively.

The conversion of the scanning lines by the system converter device of FIG. 1 is described below referring to FIG. 4. The left side of the figure indicates the processing for the odd number field of the video signals, while the right side indicates the processing for the even number field. In this case, the odd number lines having the red color difference signal R-Y multiplexed, and the even number lines having the blue color difference signal B-Y multiplexed are individually added for the conversion of the number of the scanning lines.

In other words, the first scanning line and the third scanning line of the MUSE signal are multiplied by the coefficients of ¾ and ¼, respectively, whereupon the two multiplied signals are added to form one scanning line. The 3rd scanning line and the 5th scanning line are multiplied by the coefficients of ¼ and ¾, respectively, whereupon the two multiplied signals are added to form one scanning line. The 7th scanning line and the 9th scanning line are multiplied by the coefficients of ¾ and ¼, respectively, whereupon the multiplied signals are added to form one scanning line. A likewise process is repeated so as to produce two scanning lines from every three adjacent odd numbered scanning lines of the MUSE signal.

Similarly, the 2nd scanning line and the 4th scanning line of the MUSE signal are multiplied by the coefficients of ¾ and ¼, respectively, whereupon the multiplied two signals are added to form one scanning line. The 4th scanning line and the 6th scanning line are multiplied by the coefficients of ¼ and ¾, respectively, whereupon the two multiplied signals are added to form one scanning line. The 8th scanning line and the 10th scanning line are multiplied by the coefficients of ¾ and ¼, respectively, whereupon the two multiplied signals are added to form one scanning line. A likewise process is repeated so as to produce two scanning lines from every three adjacent even numbered scanning lines of the MUSE signal.

Thus, each odd number line and even number line of the MUSE signal are converted to produce 375 lines of odd number lines and 375 lines of even number lines. This means that the 1125 scanning lines of the MUSE signal are converted to 750 lines.

In order to convert the number of the scanning lines as described above, the output signal of de-emphasis circuit 4 is multiplied by the coefficients shown in FIG. 5A in coefficient multiplier 5. That is, the 3rd scanning line and the 4th scanning line are multiplied by the coefficient of ¼, the 5th scanning line and the 6th scanning line are multiplied by the coefficient of ¾, and the 7th scanning line and the 8th scanning line are multiplied by the coefficient of 0. In a likewise manner, the coefficients are switched every two horizontal periods. The output signals of delay element 7 are multiplied by the coefficients shown in FIG. 5B in coefficient multiplier 8. That is, the 1st scanning line and the 2nd scanning line are multiplied by the coefficient of ¾, the 3rd scanning line and the 4th scanning line are multiplied by the coefficient of ¼, and the 5th scanning line and the 6th scanning line are multiplied by the coefficient of 0. In a likewise manner, the coefficients are switched every two horizontal periods.

Figure 4:
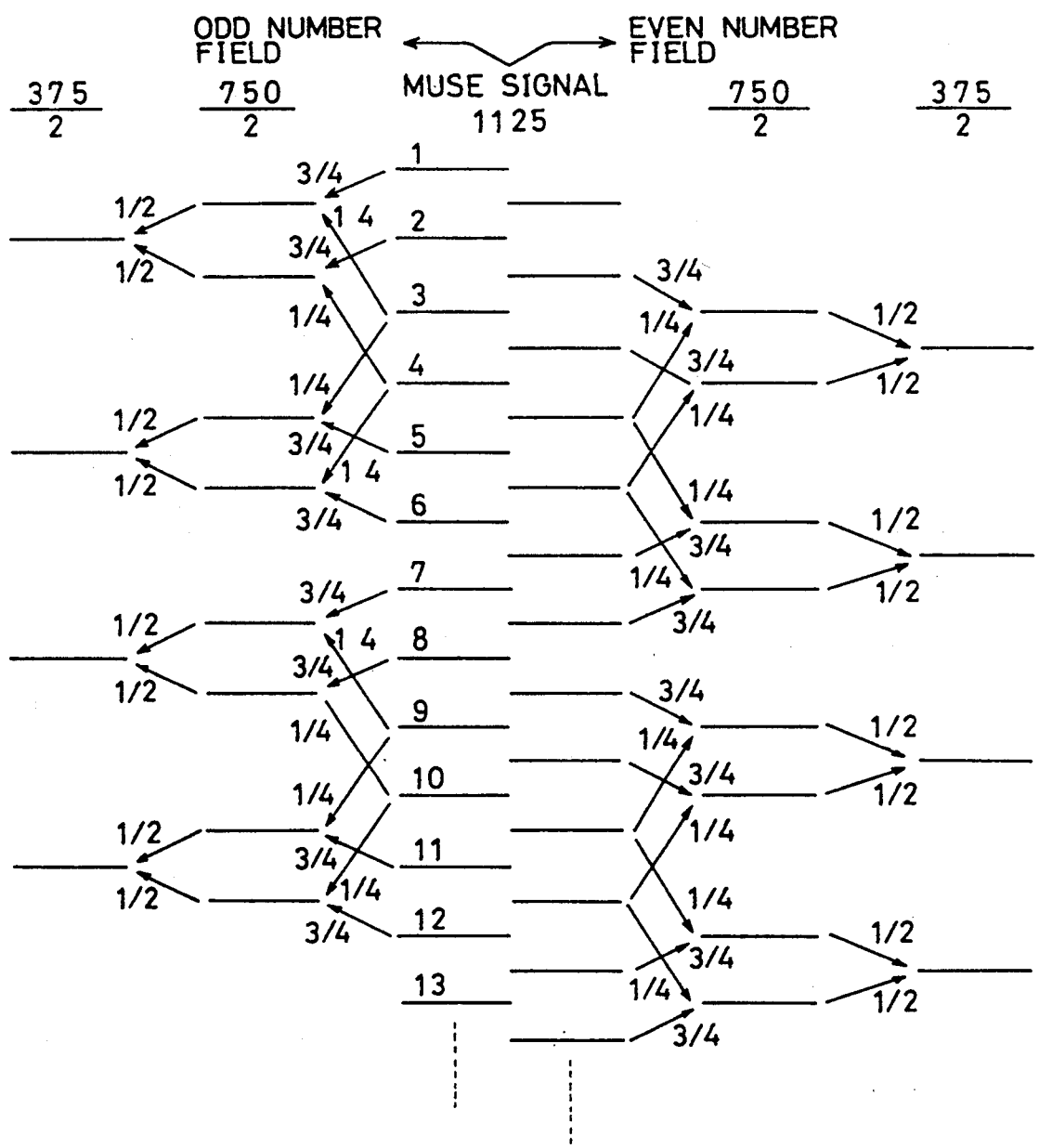
FIG. 4 is schematic diagram for explaining the conversion of the scanning lines of the system converter device of FIG. 1.

Accordingly, adder 6 provides a signal having the number of scanning lines converted as shown in FIG. 4. In this case, the red color difference signal R-Y and the blue color difference signal B-Y are separated from each other.

The output signal of adder 6 is provided to a time axis expanding circuit 9. In expanding circuit 9, the line having the blue color difference signal B-Y multiplexed is extracted from the output signal of adder 6, where one horizontal period (1H) of the extracted line has the time axis expanded to 1 horizontal period (1H') based on the NTSC system. 1H' corresponds to 63.5 μsec.

Figure 6A:
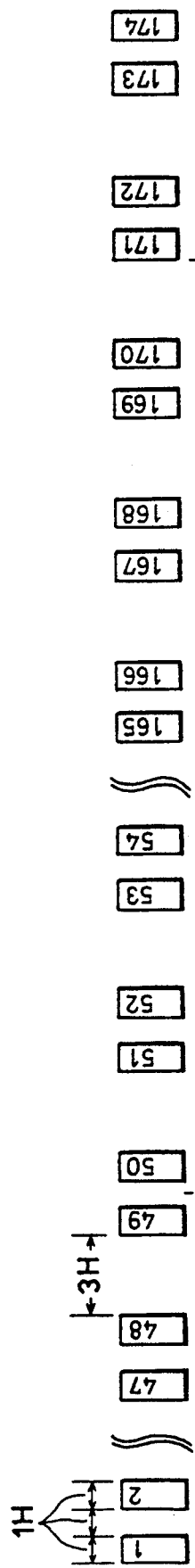
FIGS. 6A and 6B are schematic diagrams for explaining the time axis expanding process of the system converter device shown in FIG. 1.

The output signal of adder 6 is provided to delay element 10 having a delay time of 1 horizontal period (1H). The output signal of delay element 10 (shown in FIG. 5D) is provided to a time axis expanding circuit 11. The expanding circuit 11 extracts the line having a red color difference signal R-Y multiplexed from the output signal of delay element 10. 1 horizontal period (1H) of the extracted line has the time axis expanded to 1 horizontal period (1H') of the NTSC system. The delay element 10 makes the timing of the line having the red color difference signal R-Y multiplexed coincide with the timing of the line having the blue color difference signal B-Y multiplexed. The scanning lines extracted from expanding circuits 9 and 11 having the color difference signals R-Y and B-Y multiplexed, respectively, appear intermittently as shown in FIG. 6A.

For the purpose of expanding the time axis of such intermittent data, it is customary to use two field memories. First, data from each field is written into the field memory, where the written data is read out from each field memory in response to a clock signal according to the NTSC system. This means that the configuration of conventional circuits are large due to the fact that four field memories are required.

On the contrary, expanding circuits 9 and 11 of FIG. 1 each have a random access memory (hereinafter referred to as RAM) that can store scanning line data of 49 horizontal periods, in which the time axis is expanded. There are 1032 lines of effective scanning lines of the MUSE signal, so the effective scanning lines EL of the 375 scanning lines are defined as in the following equation:

$$EL = 375 \times (1032/1125) = 344 \text{ lines} \quad (1)$$

Since there are 172 lines of effective scanning lines in one field, the scanning line signals of 172 lines for each field are continuously read out from the RAM.

Figure 7:
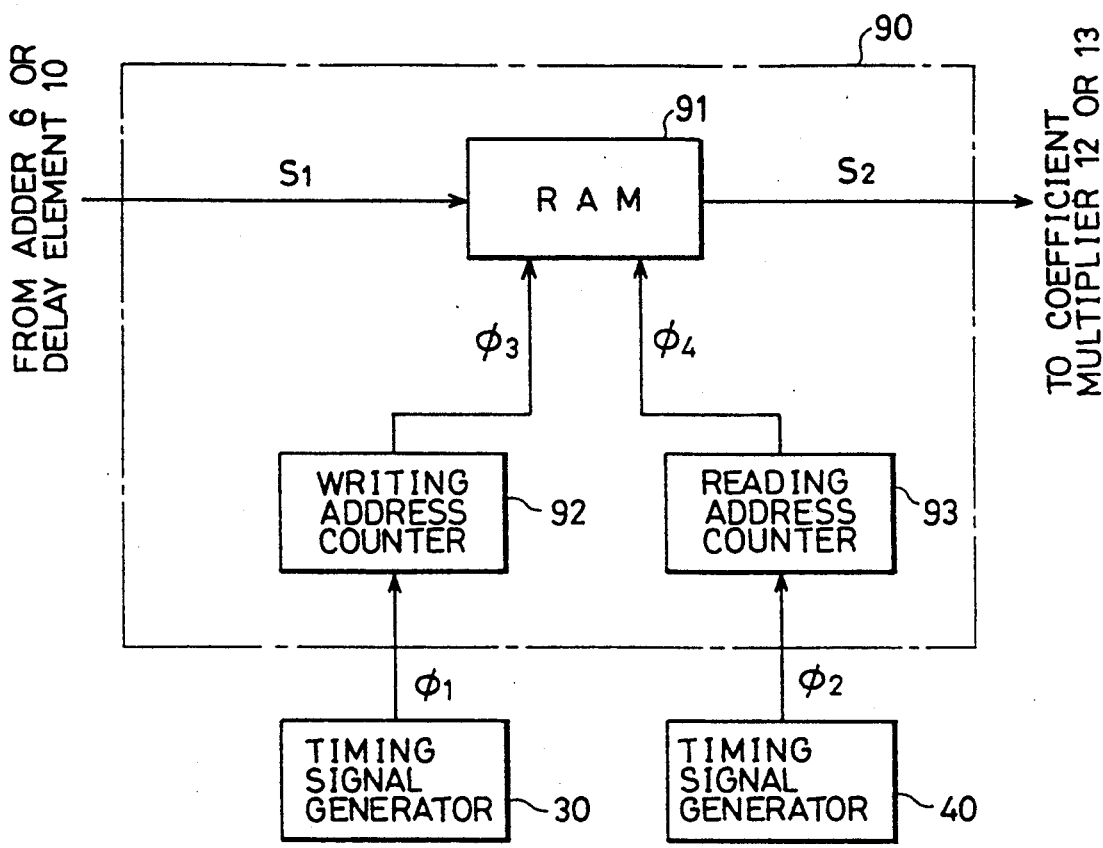
FIG. 7 is a block diagram showing an example of the time axis expanding circuit of FIG. 1.

An example of a circuit that is applicable to expanding circuits 9 and 11 are shown in FIG. 7. Referring to FIG. 7, expanding circuit 90 comprises a RAM 91, a writing address counter 92, and a readout address counter 93. Counters 92 and 93 are connected to receive predetermined clock signals $\phi 1$ and $\phi 2$ from timing signal generators 30 and 40, respectively. Clock signal $\phi 1$ has a frequency of 8.1 MHz according to the MUSE transmission system. Clock signal $\phi 2$ has a frequency of a approximately 4 MHz according to the NTSC system.

172 lines of scanning line signals are sequentially written into each RAM provided in expanding circuits 9 and 11 at a timing shown in FIG. 6A. Also, the commencement of readout is delayed so that 172 lines of scanning line data will be continuously readout by each field. In other words, by commencing the readout of the written data after the beginning data of the 171th scanning line signal is written, the 1st to 172nd scanning line signals may be readout continuously. The readout of the first scanning line signal commences at time t1 between the writing of the 49th and the 50th scanning line signals. The readout of the first scanning line signal commences after the writing of the 49th scanning line signal is completed. As a result, the 1st to 172nd scanning line signals are readout continuously by providing a RAM that can store data corresponding to 49 horizontal periods in circuits 9 and 11.

Figure 6B:
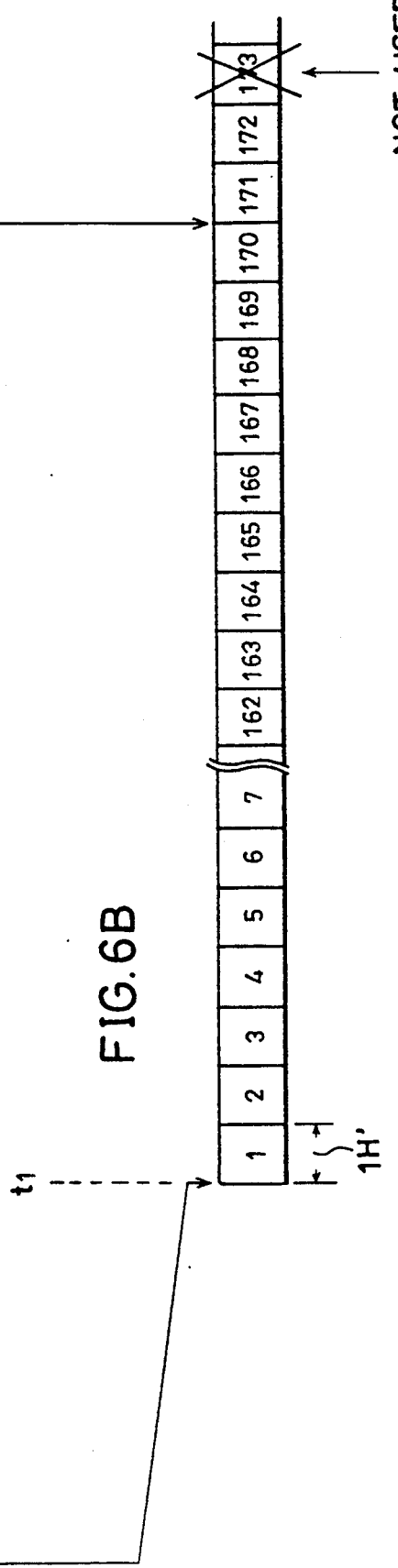

Since the 173rd scanning line signal shown in FIG. 6B is not yet written at the timing of the readout of the 173rd scanning line signal, the readout data does not indicate the data of the 173rd scanning line signal. Therefore, this data is not used.

In the above expanding circuits 9 and 11, scanning line signals according to 172 lines per field, 344 lines per frame according to the NTSC system is produced, and blankings of 181 lines are added to the relevant position of the scanning lines simultaneously. This results in the generation of 525 lines of scanning line signals according to the NTSC system.

The output signals from expanding circuits 9 and 11 are multiplied by the coefficient of $\frac{1}{2}$ by means of coefficient multipliers 12 and 13, respectively. The multiplied two signals are added by adder 14 to produce a luminance signal Y. It is noted that the produced luminance signal Y has the interlaced related position between the odd number field and the even number field, as shown in FIG. 4. The luminance signal Y provided from adder 14 is converted to an analog signal by D/A converter 15 to be applied to a matrix circuit 16 and a NTSC encoder 17.

The output signal of expanding circuit 9 is provided to time axis expanding circuit 18, where the the blue color difference signal B-Y having the time axis compressed to $\frac{1}{4}$ is expanded. The blue color difference signal B-Y provided from expanding circuit 18 is provided to an intra-field interpolation circuit 19. The interpolation circuit 19 comprises a delay element 191 having a delay time of 1 horizontal period (1 H'), $\frac{1}{2}$ coefficient multipliers 192 and 193, and an adder 194. In interpolation circuit 19, weighted mean processing is performed between two continuous scanning line signals. The blue color difference signal B-Y provided from interpolation circuit 19 is converted to an analog signal by D/A converter 20 to be applied to matrix circuit 16 and NTSC encoder 17.

The output signal of expanding circuit 11 is applied to a time axis expanding circuit 21, where the red color difference signal R-Y having the time axis compressed to $\frac{1}{4}$ is expanded. The red color difference signal R-Y provided from expanding circuit 21 is provided to an intra-field interpolation circuit 22. The interpolation circuit 22 has a circuit configuration similar to that of the above mentioned interpolation circuit 19. Interpolation circuit 22 performs weighted mean processing between continuous two scanning line signals. The red color difference signal R-Y provided from interpolation circuit 22 is converted to an analog signal by D/A converter 23 to be provided to matrix circuit 16 and NTSC encoder 17.

As a result, original color signals G, B, R indicating green, blue and red, are provided via the output terminals 24G, 24B, 24R of matrix circuit 16, respectively. A video signal SV according to the NTSC system produced by adding a carrier chrominance signal C formed by quadrature two-phase modulation of the color difference signal R-Y and B-Y, and a luminance signal Y are provided via the output terminal 25 of NTSC encoder 17. The luminance signal Y and the carrier chrominance signal C are provided from the output terminals 26Y and 26C of NTSC encoder 17.

Figure 10A:
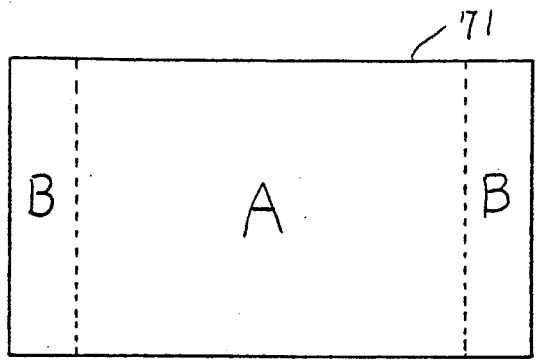
FIG. 10A is a schematic view showing the video region of a display screen according to the MUSE system.
Figure 10B:
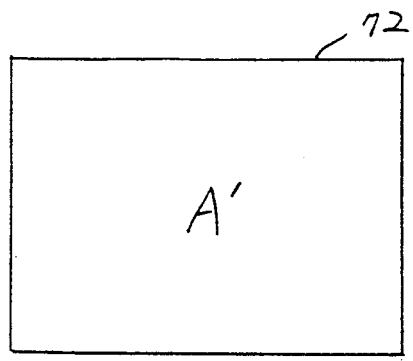
FIG. 10B is a schematic view showing the video region of the display screen when converted by a conventional system conversion system.
Figure 10C:
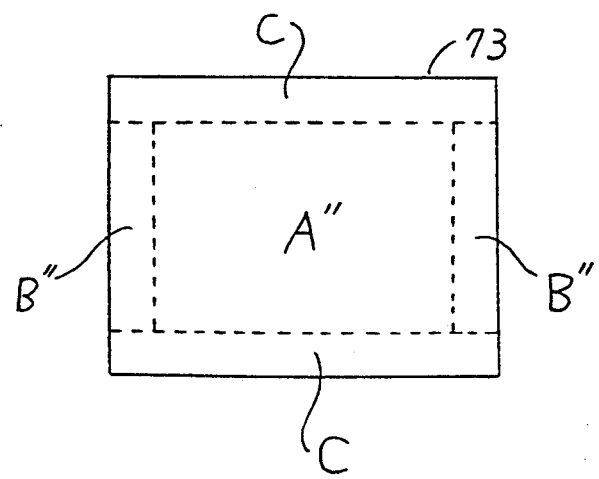
FIG. 10C is a schematic view showing the video region on the display screen achieved by the system converter device shown in FIG. 1.

In accordance with the above embodiment, it is possible to display a picture on the display screen of a television according to the NTSC system without losing the video information included in the MUSE signal, due to the fact that 375 lines of scanning line signals forming the video signal based on the NTSC system are produced from 1125 lines of scanning line signals of the MUSE signal. Referring to FIG. 10C, video regions A" and B" are provided on the display screen 73 of the NTSC system. Respective video regions A" and B" correspond to the video information included in the transmitted MUSE signal, i.e., correspond to the video regions A and B of FIG. 10A. It is noted that image B" corresponding to the video region B contained in the MUSE signal is displayed on the display screen 73 of the NTSC system of FIG. 10C.

Furthermore, since 375 lines of scanning line signals (the effective scanning lines are 344) forming the video signal of the NTSC system is produced from 1125 lines of scanning line signals of the MUSE signal, the aspect ratio of the image displayed on the television receiver under the NTSC system comes closer to the aspect ratio of the high definition television system. As a result, a good image is displayed on the display screen.

Furthermore, field memories are not required as in conventional circuits since expanding circuits 9 and 11 each have a RAM that can store data of 49 horizontal periods. The size of the circuit configuration may be reduced to lower the cost.

Figure 8:
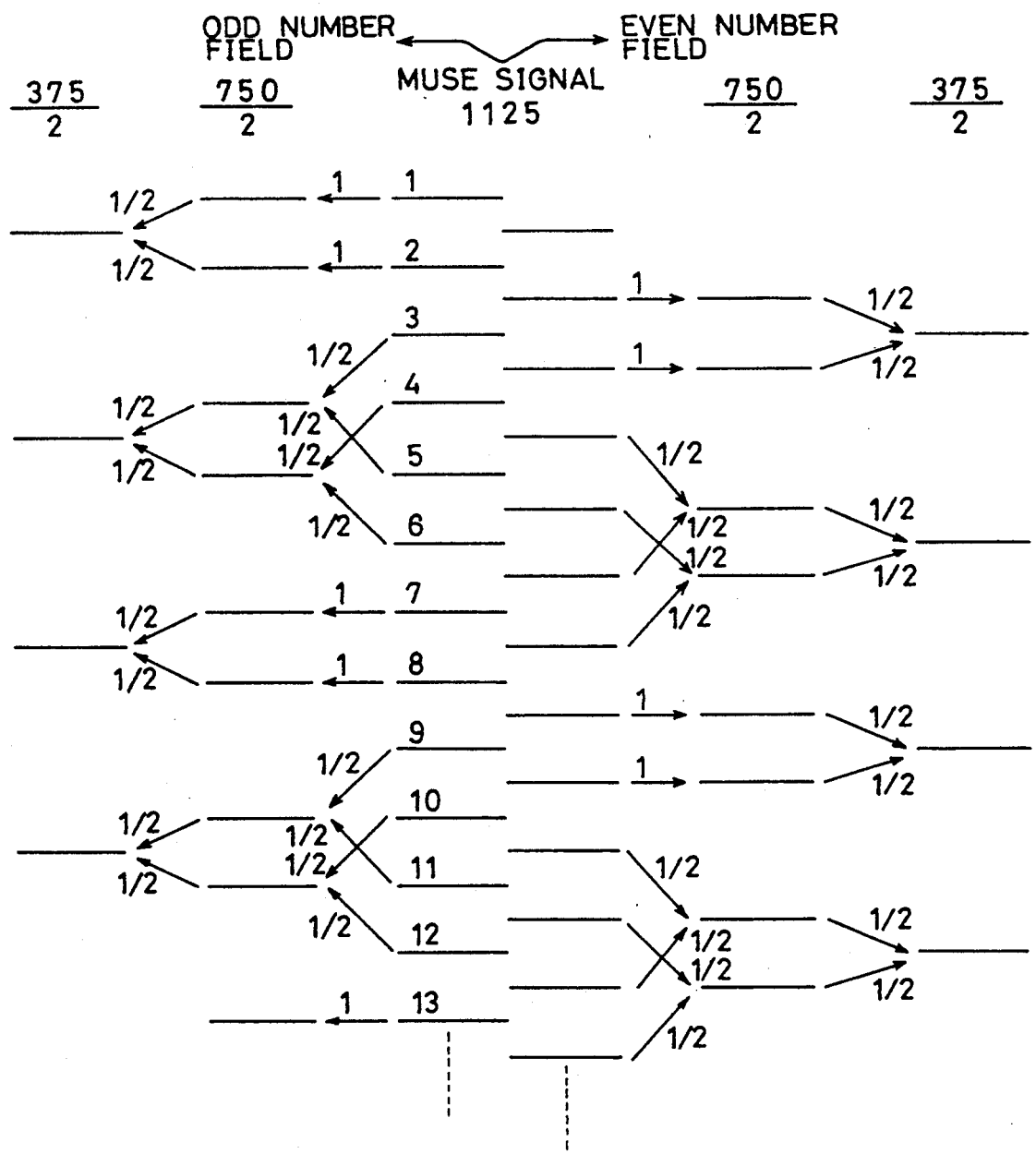
FIG. 8 is a schematic diagram for explaining the conversion of the scanning lines of the system converter device showing another embodiment of the present invention.

The number of scanning lines may be converted as shown in FIG. 8, instead of converting the scanning lines of 1125 of the MUSE signal to 750 lines as shown in FIG. 4. In the processing of odd number fields, one scanning line is produced from the first scanning line of the MUSE signal. The 3rd scanning line and the 5th scanning line are each multiplied by the coefficient of $\frac{1}{2}$, whereupon the two multiplied signals are added to produce one scanning line. One scanning line is produced from the 7th scanning line. By repeating the process in a similar manner, two scanning lines are produced from the three odd number scanning lines of the MUSE signal.

Similarly, in the processing of even number fields, one scanning line is produced from the second scanning line of the MUSE signal. The 4th scanning line and the 6th scanning line are each multiplied by the coefficient of $\frac{1}{2}$, whereupon the two multiplied signals are added to produce one scanning line. One scanning line is produced from the 8th scanning line. By repeating the process in a similar manner, two scanning lines are produced from the three even number scanning lines of the MUSE signal.

The odd number lines and the even number lines of the MUSE signal are each converted to 375 lines, causing the number of 1125 lines to be converted to 750 lines. It will be appreciated that only the value of the coefficients to be multiplied in coefficient multipliers 5 and 8 of FIG. 1 need to be changed for the conversion of the scanning lines shown in FIG. 8. In the case of FIG. 8, the coefficient multiplier 5 multiplies the output signal of de-emphasis circuit 4 by the coefficients shown in FIG. 5E. More specifically, the 3rd scanning line and the 4th scanning line are multiplied by the coefficient of 0. The 5th scanning line and the 6th scanning line are multiplied by the coefficient of $\frac{1}{2}$. The 7th scanning line and the 8th scanning line are multiplied by the coefficient of 0. The coefficients are switched every 2 horizontal periods. The coefficient multiplier 8 multiplies the output signal of delay element 7 by the coefficients shown in FIG. 5F. More specifically, the 1st scanning line and the 2nd scanning line are multiplied by the coefficient of 1. The 3rd scanning line and the 4th scanning line are multiplied by the coefficient of $\frac{1}{2}$. The 5th scanning line and the 6th scanning line are multiplied by the coefficient of 0. The coefficients are switched every 2 horizontal periods.

Figure 9:
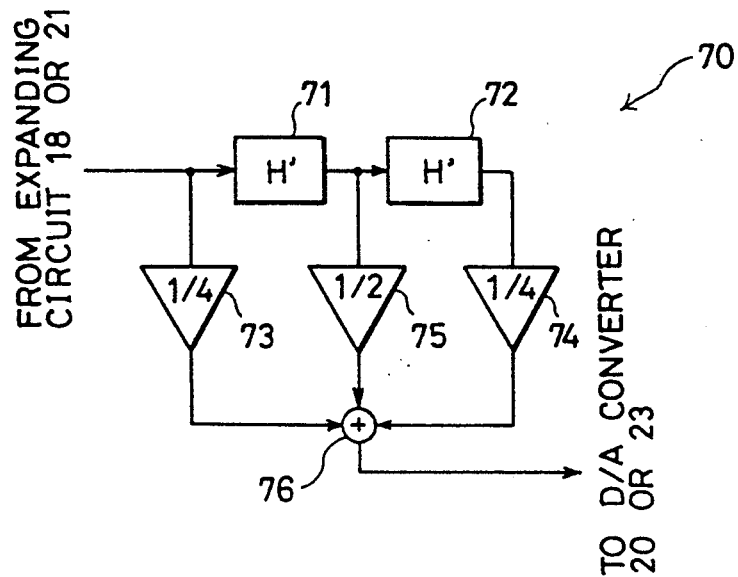
FIG. 9 is a block diagram for showing another example of an intra-field interpolation circuit that is applicable to the system converter device of FIG. 1.

The intra-field interpolation circuits 19 and 20 of FIG. 1 may be replaced by the circuit 70 shown in FIG. 9. Referring to FIG. 9, the intra-field interpolation circuit 70 comprises delay elements 71 and 72 having a delay time of 1 horizontal period (1 H'), $\frac{1}{4}$ coefficient multipliers 73 and 74, $\frac{1}{2}$ coefficient multiplier 75, and an adder 76. The weighted mean processing of three continuous scanning line signals are carried out in interfield interpolation circuit 70.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system converter device for converting a first video signal having a first predetermined number of scanning lines per frame based on a high definition television system to a second video signal having a second predetermined number of scanning lines per frame, the first number being larger than the second number, comprising:

receiving means for receiving the first video signal;

generating means for generating a plurality of scanning line signals of the second video signal, each scanning line signal of the second video signal being generated from a third predetermined number of adjacent scanning lines of the first video signal, said scanning line signals of the second video signal being time-discontinuous; and continuous means, operatively connected to said generating means, for converting said scanning line signals outputted by said generating means into time-continuous scanning line signals of the second video signal;

said generating means including, delay means, operatively connected to said receiving means, for delaying the first video signal by the period corresponding to a fourth predetermined number of scanning lines, first coefficient multiplying means, operatively connected to said receiving means, for multiplying scanning line signals of the first video signal by a predetermined first coefficient, second coefficient multiplying means, operatively connected to said delay means, for multiplying scanning line signals received from said delay means by a predetermined second coefficient, coefficient switching means, responsive to a scanning line signal of the first video signal, for switching said first and second coefficients cyclically, and adding means for adding output signals from said first and second coefficient multiplying means together.

2. The system converter device as claimed in claim 1, wherein said continuous means comprises:

storage means, operatively connected to said adding means, for storing an output signal therefrom;

first clock means for generating a first clock signal according to the first video signal;

second clock means for generating a second clock signal according to the second video signal;

writing means, responsive to said first clock signal, for writing said output signal from said adding means to said storage means; and readout means, responsive to said second clock signal, for reading out data signals from said storage means.

3. The system converter device as claimed in claim 1, wherein the high definition television system is an MUSE transmission system, the first number is 1125 lines, the second video signal is for use in a NTSC system, and the second number is 525 lines.

4. The system converter device as claimed in claim 3, wherein said third predetermined number of adjacent scanning lines is 6, and said period corresponding to said fourth predetermined number of scanning lines is two.

5. The system converter device as claimed in claim 1, wherein said receiving means comprises:

antenna means for receiving an analog video signal externally transmitted;

A/D converting means for converting said analog video signal received by said antenna means into a digital signal;

said A/D converting means providing said digital signal as the first video signal.

6. A method for converting a first video signal having a first predetermined number of scanning lines per frame based on a high definition television system to a second video signal having a second predetermined number of scanning lines per frame, wherein the first number is larger than the second number, comprising the steps of:

(a) receiving the first video signal;

(b) generating a plurality of scanning line signals of the second video signal, each scanning line signal of the second video signal being generated from six adjacent scanning lines of the first video signal, the scanning lines signal of the second video signal being time-discontinuous; and (c) making the scanning line signals of said step (c) time-continuous;

said step (b) including the steps of, (d) generating four lines of intermediate scanning line signals from six lines of adjacent scanning line signals of the first video signal, and (e) generating two lines of scanning line signals of the second video signal from the four lines generated in said step (d).

7. The method as claimed in claim 6, wherein the high definition television system is a MUSE transmission system, the first number is 1125 lines, the second video signal is to use in a NTSC system, and the second number is 525 lines.

* * * * *